United States Patent Office 3,424,497
Patented Jan. 28, 1969

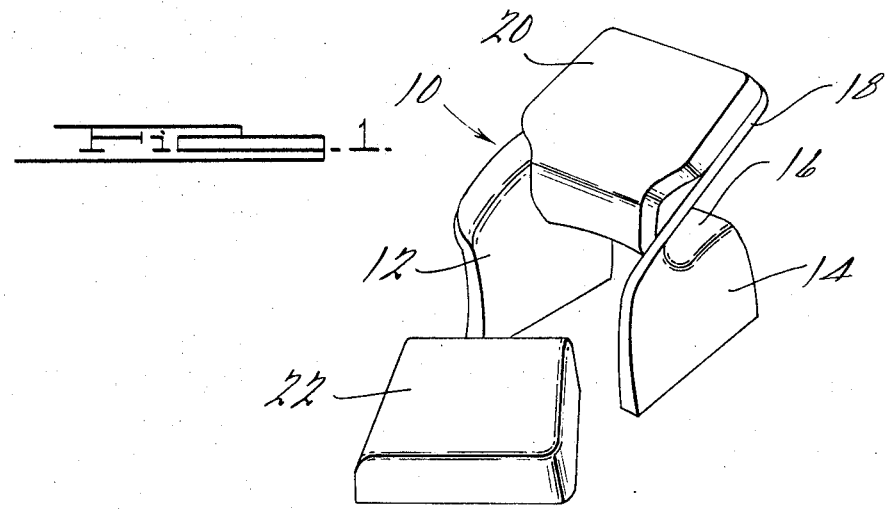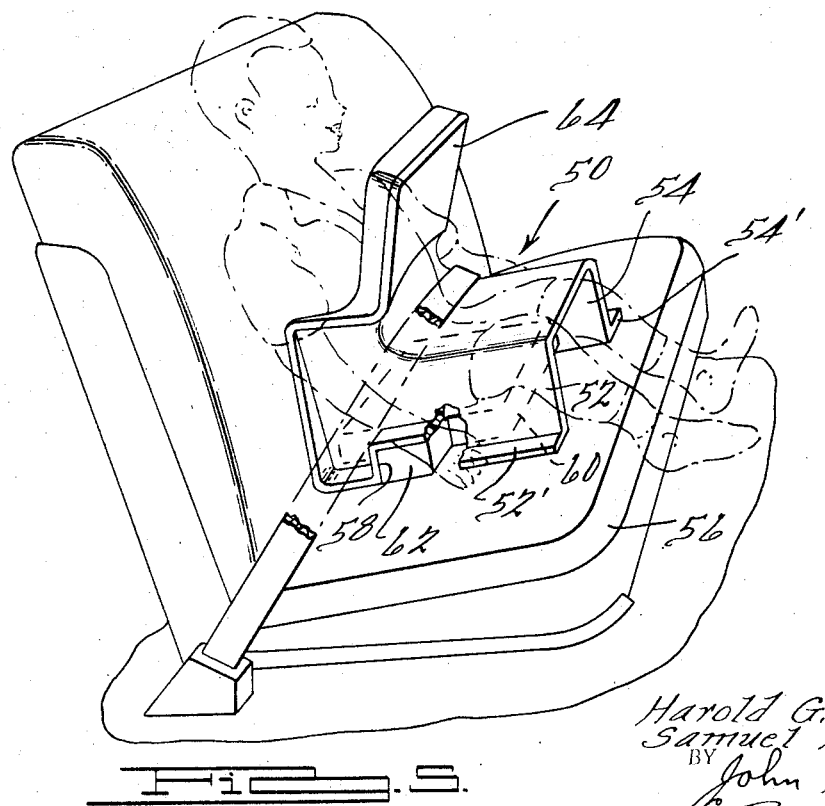

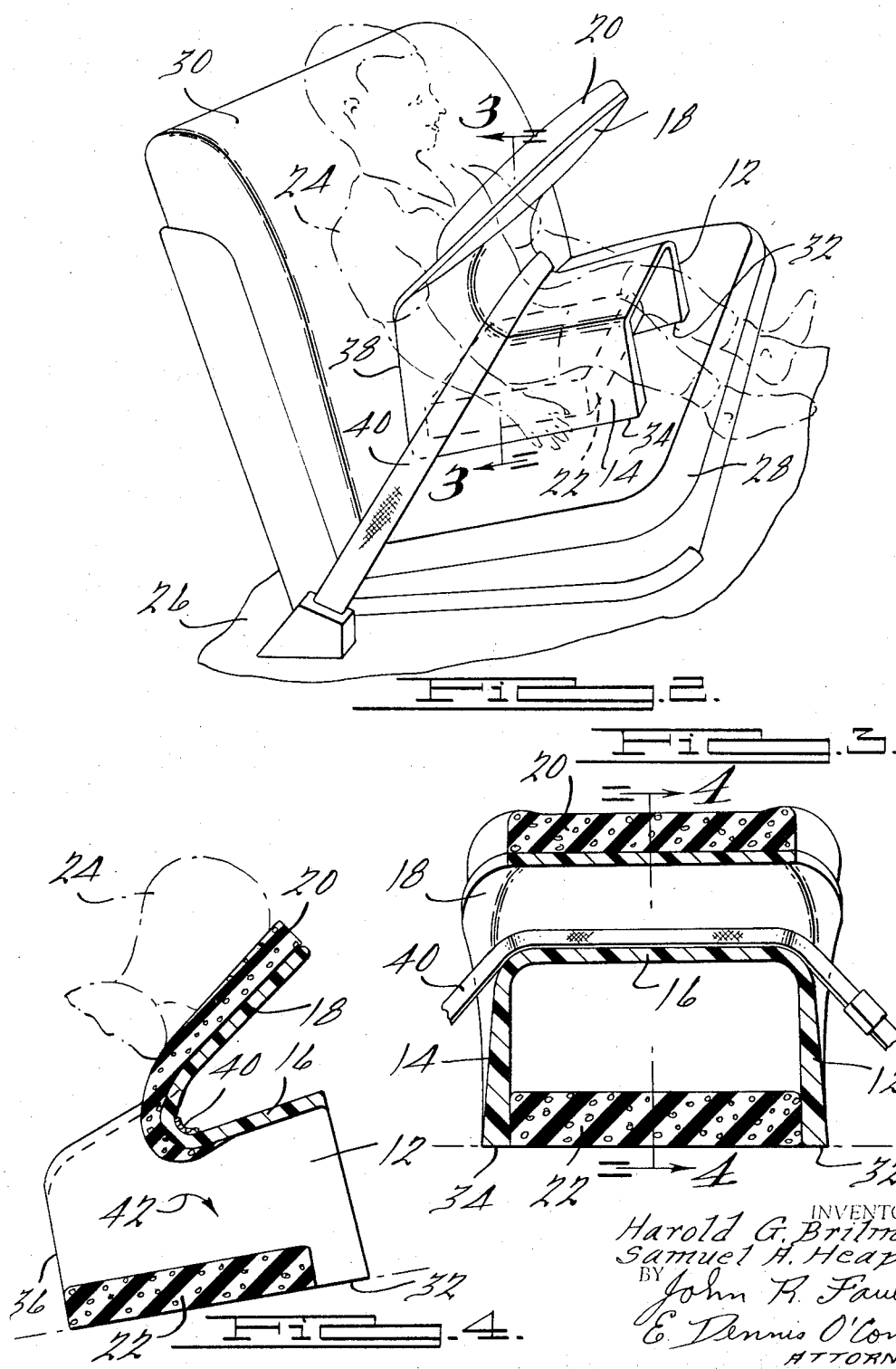

3,424,497
SAFETY DEVICE FOR RESTRAINING PASSENGERS
Harold G. Brilmyer, Grosse Pointe, and Samuel A. Heap, Taylor Township, Mich., assignors to Ford Motor Company, Dearborn, Mich., a corporation of Delaware
Filed Sept. 25, 1967, Ser. No. 670,194
U.S. Cl. 297—390            12 Claims
Int. Cl. B60r *21/10;* A63b *35/00;* A47d *1/12*

ABSTRACT OF THE DISCLOSURE

A safety device for restraining an occupant of a vehicle seat during sudden deceleration of the vehicle. The device includes a rigid frame partially surrounding the seated horizontal seat cushion, a second portion bearing on the vehicle seat back and a crash panel spaced from the passenger and extending upwardly so that it is positioned forward of the upper torso and face of the passenger. The rigid frame is held in position by a conventional vehicle lap belt.

Background of the invention

It is well known that the major cause of injury to an unrestrained motor vehicle passenger during rapid deceleration and/or crash conditions is the so-called "second collision"—the impact between the body of the passenger and his environmental surroundings in the vehicle passenger compartment. It is also known that safety devices designed to prevent the "second collision" by restraining the passenger in his seated position do themselves exert impact forces of varying magnitudes on the body of the passenger during rapid deceleration, and are most effective in preventing injury when these forces are distributed over a wide area of the passenger's body. This especially is true in the case of children whose bodies particularly are susceptible to concentrated impact forces. Also, tests have shown that the human body, when rapidly decelerated, is subject to injuries in the neck and back areas if jackknifing of the upper torso and/or head occurs.

The vehicular safety art contains devices designed to alleviate the above-mentioned injury causing conditions that may arise during rapid vehicle deceleration. One such device is shown in U.S. Patent 3,232,665, issued Feb. 1, 1966. This patent discloses a rigid frame operatively secured to vehicle body structure and partially surrounding a child seated on a vehicle passenger seat. The rigid frame prevents the child from being thrown from the seat and against adjacent passenger compartment structure during rapid deceleration of the vehicle. Also, the rigid frame is designed so that impact forces between it and the body of the child are distributed over a wide area of the child's body.

It is an object of this invention to provide a safety device for restraining vehicle passengers giving the advantages of the device disclosed in U.S. Patent 3,232,665, as well as protecting the head and neck of the vehicle passenger against injuries caused by sudden movement of these body parts due to this kinetic energy during vehicle deceleration. The device of this invention also is designed to accommodate vehicle passengers of various sizes without deleteriously affecting the injury preventing functions thereof, and is commercially feasible due to ease of construction and reliability of performance.

Summary of the invention

A safety device for restraining vehicle passengers constructed in accordance with this invention is adapted for use with a seat of a motor vehicle to protect a seat passenger against injury during a period of sudden vehicle deceleration. This device comprises a rigid frame including generally upright, spaced apart side members having bottom portions adapted to rest on the horizontal seat cushions of the vehicle seat and rear portions adapted to bear on the upright seat back of the vehicle seat. These side members are connected by a generally horizontal connecting panel to form a three-sided enclosure partially surrounding a seating vehicle passenger. A crash panel extends upwardly from the connecting panel and is spaced from the body of the seated passenger. The crash panel, in the preferred embodiment of this invention, is inclined away from the seated passenger and extends vertically to a height sufficient to permit a portion of said crash panel to be located forward of the upper torso and face of the seated passenger. Belt means are provided to secure the rigid frame to the body structure of the vehicle, thereby preventing excessive forward and upward movement of the frame and the passenger during sudden vehicle deceleration, and whereby jackknifing of the body and the head of the passenger is limited by impact of the upper torso and face of the passenger with the crash panel.

Description of the drawing

FIGURE 1 is an isometric view of a passenger restraining safety device constructed in accordance with this invention;

FIGURE 2 is a view of a device illustrated in FIGURE 1 showing said device as used to restrain a seated motor vehicle passenger;

FIGURE 3 is a vertical section of a device of FIGURES 1 and 2 taken along the line 3—3 of FIGURE 2;

FIGURE 4 is a vertical section of the device of this invention taken along the line 4—4 of FIGURE 3 and illustrating the position of the motor vehicle passenger of FIGURE 2 in relation to the device during rapid vehicle deceleration; and FIGURE 5 is a view similar to FIGURE 2 but illustrating another embodiment of this invention.

Detailed description of the invention

Referring now in detail to the drawings and in particular to FIGURE 1, the numeral 10 denotes generally the semi-rigid frame of the safety device constructed in accordance with this invention. Although rigid frame 10 is illustrated as a one-piece molding of plastic material, it readily may be appreciated that the rigid frame of this invention may be constructed of any suitable material such as a light metal and need not be an integral form, but rather may be fabricated from various components.

Frame 10 includes a pair of substantially upright, spaced apart side panels 12 and 14 interconnected by a substantially horizontal connecting panel 16. A crash panel 18 is integrally formed with panels 12, 14 and 16 and extends vertically in an inclined position. The upper surface of crash panel 18 is covered with energy absorbing material 20 such as elastomeric foam or padding. The distance between the inner surface of side panels 12 and 14 is approximately equal to the width of a cushion 22 adapted to be positioned on a vehicle seat cushion between side panels 12 and 14 as will be described in detail below.

FIGURE 2 illustrates the use of the device illustrated in FIGURE 1 to restrain a vehicle passenger 24 located within a vehicle passenger compartment having a floor member 26 and seated on a vehicle passenger seat having a substantially horizontal seat cushion 28 and a substantially vertical seat back 30. Although the passenger 24 illustrated is a child, it readily may be appreciated from the following description that a single passenger restraining device constructed in accordance with this invention may be used to restrain vehicle passengers of varying dimensions. Also, rigid frame 10 may be constructed to any desired dimensions so that vehicle passengers of all sizes may utilize such devices. For example, although in FIGURE 2 passenger 24 is illustrated as resting on cushion 22 that in turn lies on seat cushion 28, if the frame 10 illustrated were to be used to restrain a passenger larger than passenger 24, cushion 22 may be eliminated and said larger passenger may be seated directly on seat cushion 28. A large adult passenger may be restrained by a device similar in construction to frame 10 but having dimensions substantially greater than the dimensions of frame 10.

It may be observed that frame 10 is positioned such that side panels 12 and 13 are located on either side of passenger 24 with bottom surfaces 32 and 34 of side panels 12 and 13 respectively bearing on seat cushion 28. Rear edges 36 and 38 of side panels 12 and 14 respectively rest against seat back 30.

With rigid frame 10 positioned as illustrated in FIGURE 2, it may be observed that the padded surface of crash panel 18 is proximate to the face and upper torso of passenger 24. Crash panel 18 extends vertically to a sufficient height such that it lies forward of the face of passenger 24. The importance of this relationship of crash panel 18 and the face of seat occupant 24 will be explained below. A conventional vehicle lap belt 40 may be used to secure rigid frame 10 in the position illustrated in FIGURE 2. Such a belt comprises a pair of belt segments, each of the segments having one end anchored to vehicle floor 26 with the other end of said belt segments carrying cooperating buckling means.

During rapid deceleration and/or crash conditions, there is a tendency for vehicle passenger 24 and rigid frame 10 to move forward and upward from the position illustrated in FIGURE 2. Due to the presence of belt 40, however, rigid frame 10 is held in place as vehicle passenger 24 moves in a forward direction against said frame. As passenger 24 contacts frame 10, the kinetic energy of the torso and head of passenger 24 will cause the body of said passenger to jackknife or fold about the passenger's waist. Under these conditions, the head and upper portion of the torso move forward and downward until the face and upper torso contact padding 20 of crash panel 18 as illustrated in FIGURE 4.

The presence of padding 20 dissipates a portion of the impact energy caused by this contact. Additional impact energy is absorbed due to a rotation of rigid frame 10 in a clockwise direction as illustrated in FIGURE 4 and represented by the arrow 42. This rotation is due to the forces exerted upon frame 10 by the body of passenger 24. As this rotation occurs, the side panel bottom edges 32 and 34 and rear edges 36 and 38 will be pressed into the padding of seat cushion 28 and seat back 30 deforming these seat members and thereby absorbing additional impact energy. It may be appreciated that the presence of rigid frame 10 precludes the impact of passenger 24 against such passenger compartment structural members as the vehicle dash panel, instrument panel and windshield.

FIGURE 5 illustrates a second embodiment of rigid frame 50 constructed in accordance with this invention. Rigid frame 50 includes spaced apart side panels 52 and 54 having flanges 52' and 54', respectively extending from the bottom edges thereof and resting on seat cushion 56 of a vehicle seat. Side panel 52 has formed along the bottom edge thereof a recess 58. A cushion 60 resting on seat cushion 56 and bearing the vehicle passenger has projecting therefrom an extension 62 that is received in recess 58. A similar cushion projection is formed on the side of cushion 60 opposite extension 62 and is received in a recess (not shown) formed in the bottom surface of side panel 54.

The cooperation between the extensions formed on cushion 60 and the recesses formed on side panels 52 and 54 prohibits movement of cushion 60 relative to rigid frame 50. Therefore, despite movement by the vehicle passenger restrained by frame 50 and forces occurring during rapid vehicle deceleration, the displacement of cushion 60 from the position illustrated in FIGURE 5 cannot occur and an increase in the clearance between the body of the vehicle passenger and frame 50 that would allow excessive unrestrained movement of said passenger is precluded.

It should be noted that although crash panel 18 of rigid frame 10, described above, is inclined vertically away from the face and upper torso of the restrained vehicle passenger so that the vehicle passenger may have a greater sense of freedom and a relatively unimpeded view, there is no functional necessity for such an orientation of the crash panel. Thus, crash panel 64 of rigid frame 50 is illustrated in FIGURE 5 as essentially vertical. It is stressed, however, that crash panel 64 extends vertically to a height such that it lies horizontally in front of the face of the restrained vehicle passenger as does crash panel 18 of frame 10.

It may thus be seen that this invention provides a safety device restraining passengers such that said passengers are not impacted against the structural members defining a vehicle passenger compartment during periods of rapid vehicle deceleration. The device of this invention also provides that impact forces between the restrained vehicle passenger and the restraining device are spread over relatively large areas of the body of the restrained passenger. Furthermore, the device of this invention minimizes the possibility of neck and back injuries caused by a violent jackknifing of the head and/or upper torso of the passenger.

It is to be understood that this invention is not limited to the exact construction illustrated and described above or the abstract preceding this specification, but that various changes and modifications may be made without departing from the spirit and scope of the invention as defined by the following claims.

We claim:

1. In a motor vehicle having body structure defining a passenger compartment and a forward facing passenger seat secured to said body structure within said compartment, said seat including a substantially horizontal seat cushion and a substantially vertical seat back, rigid frame means surrounding a vehicle passenger seated on said seat and permitting only limited movement of said passenger, said frame member including a first portion bearing on said seat cushion, a second portion bearing on said seat back and panel means extending upwardly so that a portion of said panel means is positioned forwardly of at least a portion of the face of said passenger, and a belt member anchored to said body structure and securing said frame means against forward movement.

2. The combination of claim 1, wherein the surface of said panel proximate said passenger is covered with energy absorbing padding.

3. The combination of claim 1, wherein said belt member comprises a pair of belt segments, one end of each of said segments secured to said body structure, the other ends of said segments having cooperating buckling means thereon.

4. The combination of claim 1, wherein said frame means comprises a one-piece molding of plastic material.

5. The combination of claim 1, wherein said frame means has a pair of upright, spaced apart side members, each of said side members having a generally horizontal bottom portion bearing on said seat cushion and a generally upright rear portion bearing on said seat back, and a generally horizontal connecting panel joining said side member and located remote from said seat cushion, said panel means being integral with both of said side members and said connecting panel.

6. The combination of claim 5, wherein said panel means are inclined away from said passenger.

7. The combination of claim 5, wherein said panel means extend substantially vertically.

8. The combination of claim 5, wherein a cushion, distinct from said seat cushion and lying thereon, is positioned beneath said frame means to support said passenger, the bottom portion of each of said side members having a recess formed therein, said cushion having a pair of extensions projecting therefrom, each of said extensions being received in one of said recesses to prevent movement of said cushion relative to said frame means.

9. A safety device to protect a seat passenger against injury during a period of sudden vehicle deceleration, said device adapted for use with a forward facing vehicle seat and comprising a rigid frame including generally upright, spaced apart side members having bottom portions adapted to rest on the horizontal seat cushion of a vehicle seat and rear portions adapted to bear on the upright seat back of a vehicle seat, said side members being connected by a generally horizontal connecting panel to form a three sided enclosure partially surrounding a seated vehicle passenger, a crash panel spaced from the body of a seated passenger, said crash panel being inclined away from a seated passenger and extending vertically to a height sufficient to permit a portion of said crash panel to be located forward of the upper torso and face of said passenger, and belt means securing said frame to said body structure and preventing forward and upward movement of said frame and said passenger during sudden vehicle deceleration, and whereby jackknifing of the body of said passenger is limited by impact of the upper torso and face of said passenger with said crash panel.

10. The device of claim 9, wherein the surface of said crash panel proximate said passenger is covered with impact energy absorbing padding.

11. The device of claim 9, wherein said rigid frame is a one-piece molding of plastic material.

12. The device of claim 9, including a cushion positioned between said side members and adapted to lie on the vehicle seat cushion and support a seated passenger, and cooperating engaging means on said cushion and each of said side members preventing forward and upward movement of said cushion relative to said rigid frame.

References Cited

UNITED STATES PATENTS

| | | | |
|---|---|---|---|
| 2,736,364 | 2/1956 | Janus | 297—250 |
| 2,777,502 | 1/1957 | Travis | 297—250 |
| 3,129,017 | 4/1964 | Graham | 280—150 B |
| 3,207,552 | 9/1965 | Loughney | 297—250 X |
| 3,220,769 | 11/1965 | Regan | 297—390 X |
| 3,232,665 | 1/1966 | Von Wimmersperg | 297—390 |
| 3,243,822 | 4/1966 | Lipkin | 297—216 |
| 3,325,213 | 6/1967 | Levy | 297—250 |

JAMES T. McCALL, *Primary Examiner.*

U.S. Cl. X.R.

297—384, 250, 216